United States Patent
You et al.

(10) Patent No.: US 12,512,079 B1
(45) Date of Patent: Dec. 30, 2025

(54) DUAL DISPLAY ENABLING INDEPENDENT CONTROL OF RESOLUTION AND FREQUENCY USAGE ON WIDE DISPLAY PANELS

(71) Applicant: DELL PRODUCTS L.P., Round Rock, TX (US)

(72) Inventors: Jaehyun You, Singapore (SG); BongJun Lee, Singapore (SG); Seungjae Sung, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/790,028

(22) Filed: Jul. 31, 2024

(51) Int. Cl.
  G09G 3/36 (2006.01)
  G09G 3/20 (2006.01)
  G09G 5/00 (2006.01)

(52) U.S. Cl.
  CPC ......... *G09G 3/3677* (2013.01); *G09G 3/2096* (2013.01); *G09G 5/005* (2013.01); *G09G 5/006* (2013.01); *G09G 2310/0243* (2013.01); *G09G 2310/08* (2013.01)

(58) Field of Classification Search
  CPC .. G09G 3/3266; G09G 3/3644; G09G 3/3666; G09G 3/3677; G09G 2310/0221; G11C 19/28
  See application file for complete search history.

(56) References Cited

U.S. PATENT DOCUMENTS

| | | | |
|---|---|---|---|
| 9,212,310 B2 | 12/2015 | Wang et al. | |
| 11,521,551 B2 * | 12/2022 | Onoyama | G09G 3/3266 |
| 12,288,535 B2 * | 4/2025 | Kondoh | G06F 3/1446 |
| 2015/0161928 A1 * | 6/2015 | Kim | G09G 3/3225 345/1.3 |
| 2016/0267881 A1 * | 9/2016 | Tann | G09G 5/393 |
| 2018/0068629 A1 * | 3/2018 | Shin | G02F 1/13454 |
| 2018/0174541 A1 * | 6/2018 | Takahashi | G09G 3/3666 |
| 2021/0150659 A1 | 5/2021 | Guerra et al. | |
| 2023/0360583 A1 * | 11/2023 | Kato | G06F 3/04162 |

* cited by examiner

*Primary Examiner* — Xuemei Zheng
(74) *Attorney, Agent, or Firm* — Larson Newman, LLP (57) ABSTRACT

A Liquid Crystal Display (LCD) circuit includes a gate-in-panel (GIP) region and first and second timing and control (TCON) circuits. The GIP region partitions a gate driving circuit into first and second area circuits having first and second pluralities of gate driving lines, respectively. The GIP region intersects the first and second pluralities of gate driving lines at first and second corresponding ends, respectively. The first and second TCON circuits are configured to provide independent TCON functions to the first and second area circuits, respectively. The first and second pluralities of gate driving lines are arranged in a first direction. The GIP region is arranged in a second direction perpendicular to the first direction.

15 Claims, 7 Drawing Sheets

DUAL DISPLAY ENABLING INDEPENDENT CONTROL OF RESOLUTION AND FREQUENCY USAGE ON WIDE DISPLAY PANELS

FIELD OF THE DISCLOSURE

This disclosure generally relates to display systems, and more particularly relates to dual display for independent control of resolution and frequency usage on wide display panels.

BACKGROUND

As the value and use of information continues to increase, individuals and businesses seek additional ways to process, store, and display information. One option is an information handling system. An information handling system generally processes, compiles, stores, communicates and/or display information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, display, and communicate information and may include one or more computer systems, data storage systems, and networking systems.

SUMMARY

A Liquid Crystal Display (LCD) circuit includes a gate-in-panel (GIP) region and first and second timing and control (TCON) circuits. The GIP region partitions a gate driving circuit into first and second area circuits having first and second pluralities of gate driving lines, respectively. The GIP region intersects the first and second pluralities of gate driving lines at first and second corresponding ends, respectively. The first and second timing and control (TCON) circuits are configured to provide independent TCON functions to the first and second area circuits, respectively. The first and second pluralities of gate driving lines are configured to be arranged in a first direction. The GIP region is configured to be arranged in a second direction perpendicular to the first direction.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
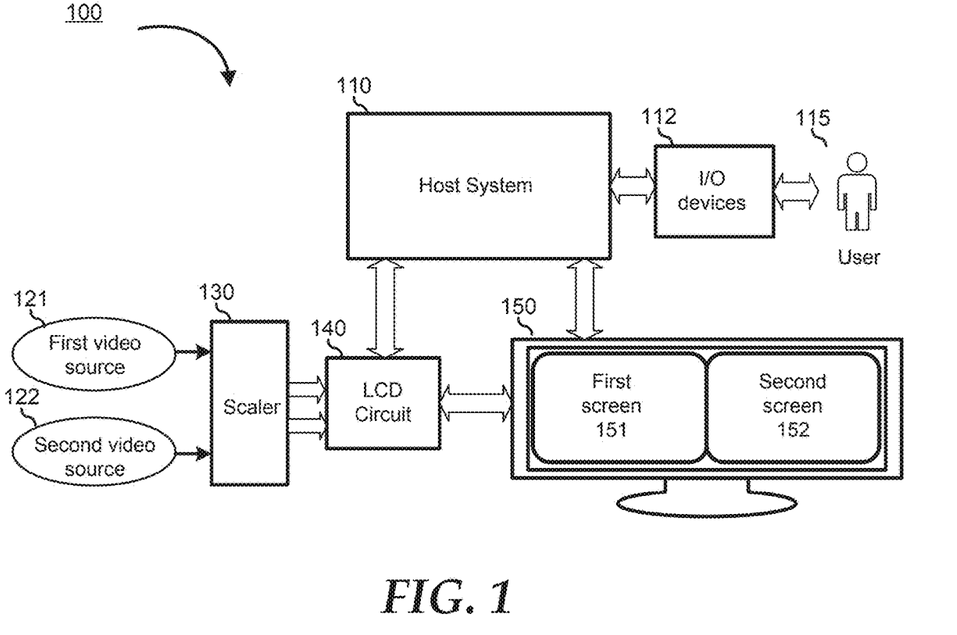
FIG. 1 is a block diagram illustrating a system according to an embodiment of the present disclosure.

FIG. 1 is a block diagram illustrating a system 100 according to an embodiment of the present disclosure. The system 100 includes a host system or apparatus 110, a first video source 121, a second video source 122, a scaler 130, a Liquid Crystal Display (LCD) circuit 140 and a display panel 150.

The host system 110 may be an information handling system that interacts with a user 115 via input/output devices 112 such as a keyboard, a mouse, a stylus, a game console, a joystick, a speaker, or a microphone. The host system 110 may receive commands from the user 115 to process or handle information. For example, the host system 110 may process images or graphical data or information and present the images or graphical data or information to display panel 150. In particular, the host system 110 may provide control functions to the scaler 130 and the LCD circuit 140 to select and process the video signals from the first and second video sources 121 and 122. The host system 110 will be further described in FIG. 8. User 115 may carry out multiple tasks at the same time and therefore want to have multiple display screens on display panel 150. In one embodiment, display panel 150 may have two independent display screens, first screen 151 and second screen 152, which are separate and operate independently of each other. For example, the user 115 may want to watch a movie on the first screen 151 while working on his or her project using the second screen 152. Because they may be used for different tasks, the first and second screens 151 and 152 may have different display characteristics, such as different display resolutions and frequency usages (e.g., refresh rates). In addition, since they are used for different tasks using different applications, they typically operate independently and therefore are under independent controls. Furthermore, they may not be synchronized.

The first and second video sources 121 and 122 are sources that provide video signals to be processed and displayed on display panel 150. The video signals may be analog or digital. Analog video signals may be converted to digital signals via analog-to-digital converters which may be incorporated in the scaler 130. The first and second video sources 121 and 122 may be any one of media or video sources. Examples of these sources include Digital Versatile Disc (DVD), video cameras, camcorders, Video Home System (VHS). The video signals may follow any analog or digital video standards such as National Television System Committee (NTSC), Phase Alternate Line (PAL), Sequential Color and Memory (SECAM), Advanced Video Codec High Definition (AVCHD), Motion Picture Expert Group (MPEG) 14, MP-4, High Definition Multimedia Interface (HDMI), Digital Visual Interface (DVI), Serial Digital Interface (SDI), and Low Voltage Differential Signaling (LVDS). The video signals from the first and second video sources 121 and 122 may be independent and not synchronized. The two video signals may be displayed on display panel 150 as two separate and independent screens.

The scaler 130 converts a video signal from a first display resolution to a second display resolution. Typically, the first display resolution is less than the second display resolution, i.e., the scaler 130 upscales or upconverts the video signal at a lower resolution to a higher resolution. Sometimes, in order to maintain compatibility, it may be necessary to convert a signal with a high resolution to a lower resolution. The scaler 130 may accept input signals in digital or analog form. If the input signal is analog, the scaler 130 may have an analog-to-digital converter to convert the analog signal into digital signal. The scaler 130 delivers the digital video signals to the LCD circuit 140 using a digital video format such as Embedded Display Port (eDP), LVDS, HDMI, or DVI.

The LCD circuit 140 may perform two main functions: (1) to provide independent controls for having two display screens on display panel 150, and (2) to reinforce the signals on the gate driving lines to reduce signal distortion. The LCD circuit 140 may communicate with the host system 110 to transmit or receive command or data. It may control display panel 150 to enable displaying two images at different resolutions and/or refresh frequencies simultaneously and independently.

Display panel 150 may be a wide display panel with high resolution. The term "display panel" may refer to any device that is configured to display data or information on a screen, such as a video or graphical display, a monitor, a viewscreen, a display console, a video or graphic terminal, a visual display, or a display workstation. In one embodiment, display panel 150 may support a color LCD display with a display resolution of 7,680×4,320. Other resolutions are also supported. The display panel screen may include multiple display screens that operate independently of one another. In one embodiment, display panel 150 may have a first screen 151 and a second screen 152. Display panel 150 includes LCD panel which may include typical layers in an LCD display. These layers may include backlight, vertical polarizer, Thin-Film Transistor (TFT) substrate, Red Green Blue (RGB) color filter, horizontal polarizer, and glass cover. The LCD circuit 140 is interfaced to the TFT substrate to control the display of pixels on the screens.

Figure 2A:
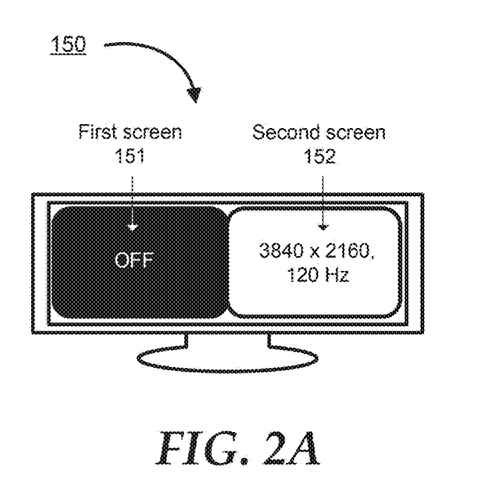
FIGS. 2A and 2B illustrate examples of independent control of the display according to another embodiment of the present disclosure.
Figure 2B:
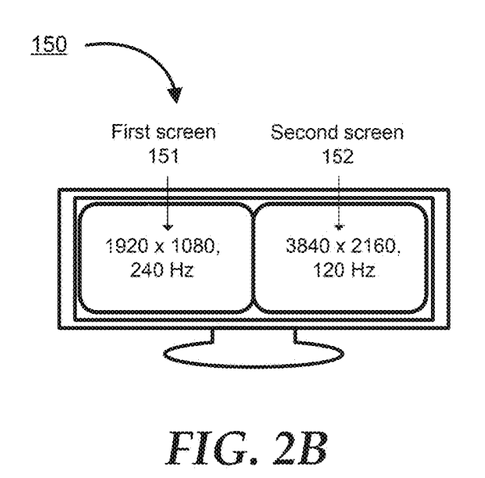

FIGS. 2A and 2B illustrate two examples of independent control of the display according to another embodiment of the present disclosure. FIG. 2A illustrates the case in which the first screen 151 is turned off to save power while the second screen is used at a resolution of 3640×2180 and a refresh frequency of 120 Hz. FIG. 2B illustrates the case in which the first screen operates at a display resolution of 1920×1080 at 240 Hz and the second screen operates at a display resolution of 3840×2160 at 120 Hz.

The display resolutions for the screens may be any suitable resolutions, including High Definition (HD) (1280×720), Full HD (1920×1080), Quad HD (2560×1440), Ultra HD or 4K (3840×2160), and 8K (7680×4320). Similarly, the refresh frequency may be any suitable frequencies including 60 Hz, 120 Hz, 144 Hz, 240 Hz, and 360 Hz. Higher frequencies such as 400 Hz or even 500 Hz and above may also be used. The above values are only for illustration.

A typical LCD display includes a matrix of pixels formed by individual TFTs. In the embodiment shown in FIG. 3, this matrix has N rows and 2M columns. The matrix is divided into two panels, each panel has N rows and M columns for a total of NM pixels. Each pixel includes three subpixels corresponding to the RGB colorization of the pixel. These pixels are driven by data drivers (or source drivers) and gate drivers. The data drivers drive data driving lines which are connected to the source terminals of the TFTs on the same column. The gate drivers drive gate driving lines which are connected to the gate terminals of the TFTs on the same row. By controlling the data and gate drivers to drive the corresponding data lines and gate lines at proper timing instants, the pixel data will be enabled or disabled to light up corresponding colors.

Figure 3:
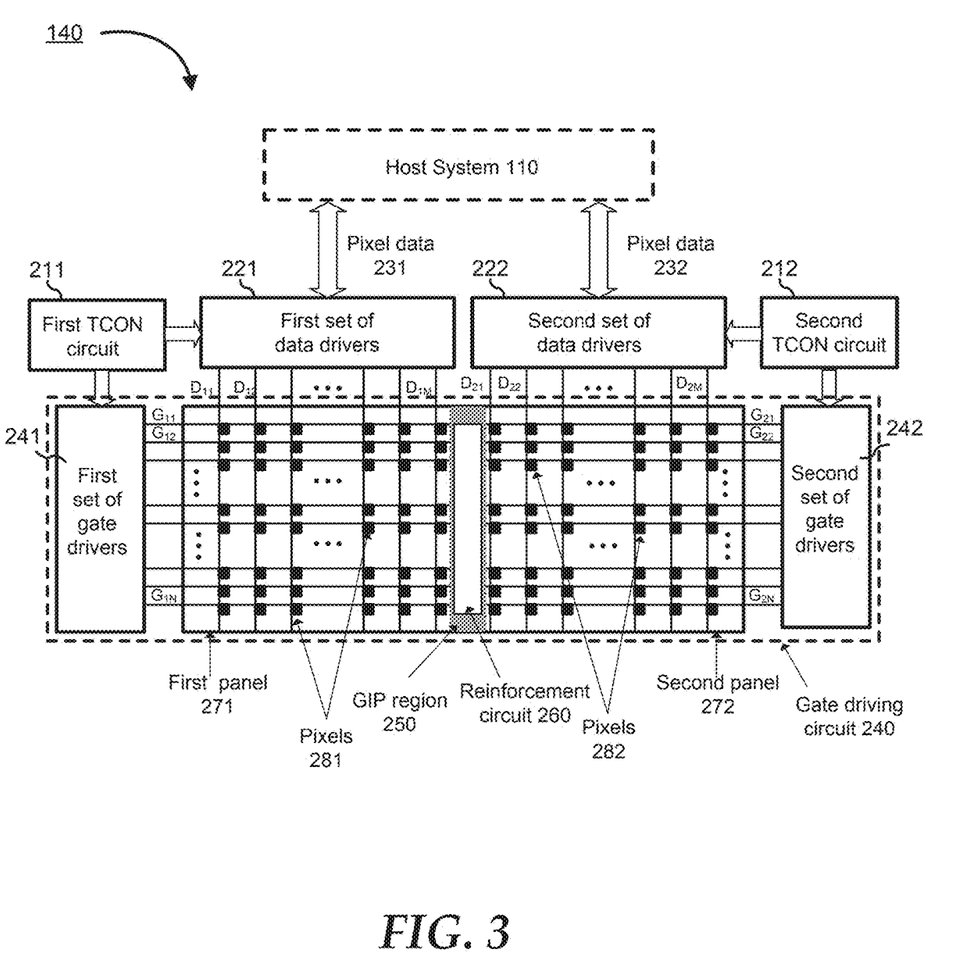
FIG. 3 is a diagram illustrating an LCD circuit according to an embodiment of the present disclosure.

FIG. 3 is a diagram illustrating the LCD circuit 140 according to an embodiment of the present disclosure. The LCD circuit 140 includes a first Timing and Control (TCON) circuit 211, a second TCON circuit 212, a first set of data (or source) drivers 221, a second set of data (or source) drivers 222, and a gate driving circuit 240. The gate driving circuit 240 includes a first set of gate drivers 241, a second set of gate drivers 242, a first panel 271, a second panel 272, a GIP region 250, and a reinforcement circuit 260.

Figure 5:
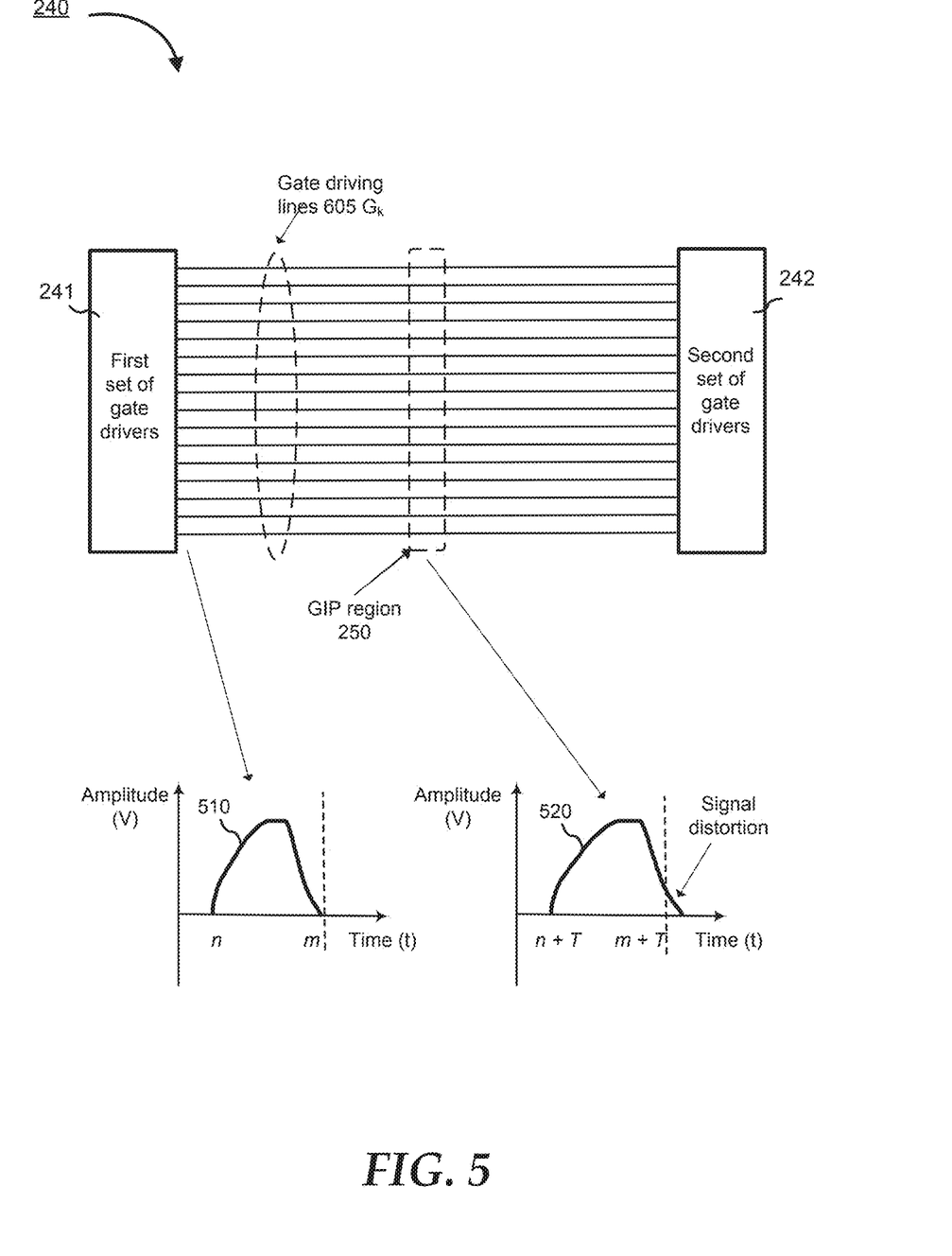
FIG. 5 is a diagram illustrating signal distortion when the reinforcement circuit is not used according to an embodiment of the present disclosure.

The GIP region 250 is a region that contains the reinforcement circuit 260. It is positioned in the middle of the gate driving circuit 240 and partitions or divides the gate driving circuit 240 into first and second area circuits defined by the first and second panels 271 and 272. To designate a driver, three parameters are used: S, p, and q in $S_{pq}$ where S is the letter D for data and G for gate. The index p refers to the partition number or the area circuit number: p=1 refers to the first area circuit or the left partition, p=2 refers to the second area circuit or the right partition. The index q refers to the line number. For data, there are M driving lines, so q ranges from 1 to M. For gate, there are N driving lines, so q ranges from 1 to N. When there is no partition (such as shown in FIG. 5), there is no index p. The first set of gate drivers 241 drives N gate driving lines $G_{11}, G_{12}, \ldots, G_{1N}$ in the first area circuit. In the embodiment shown in FIG. 3, the gate driving lines $G_{11}, G_{12}, \ldots, G_{1N}$ are configured to be arranged in a first direction. The second set of gate drivers 242 drives N gate driving lines $G_{21}, G_{22}, \ldots, G_{2N}$ in the second area circuit, also arranged in the first direction. In the drawing, the first direction is the horizontal direction. The GIP region 250 intersects the gate driving lines $G_{11}, G_{12}, \ldots, G_{1N}$ at first corresponding ends on the left edge of the GIP region 250. Similarly, the GIP region 250 intersects the gate driving lines $G_{21}, G_{22}, \ldots, G_{2N}$ at second corresponding ends on the right edge of the GIP region 250.

The first set of data drivers 221 obtains the pixel data 231 from the host system 110. The second set of data drivers 222 obtains the pixel data 232 from the host system 110. In one embodiment, they obtain the pixel data from sources other than the host system 110, such as the scaler 130 or memories that store pixel data. The first set of data drivers 221 drives the data driving lines $D_{11}, D_{12}, \ldots, D_{1M}$ and transmits the pixel data to the TFT pixels, collectively referred to as pixels 281. The pixels 281 are located in the first panel 271. The second set of data drivers 221 drives the data driving lines $D_{21}, D_{22}, \ldots, D_{2M}$ and transmits the pixel data to the TFT pixels, collectively referred to as pixels 282. The pixels 282 are located in the second panel 272. The first panel 271 corresponds to the first screen 151 of display panel 150. The second panel 272 corresponds to the second screen 152 of display panel 150. In FIG. 3, the data driving lines $D_{11}, D_{12}, \ldots, D_{1M}$ and $D_{21}, D_{22}, \ldots, D_{2M}$ are arranged in a second direction. Similarly, the GIP region 250 is configured to be longitudinally arranged in the second direction. In the figure, the second direction is the vertical direction. Therefore, the first direction is perpendicular to the second direction.

The first TCON circuit 211 generates timing and control signals to the first set of data drivers 221 and the first set of gate drivers 241. The second TCON circuit 212 generates timing and control signals to the second set of data drivers 222 and the second set of gate drivers 242. The first and second sets of TCON circuit 211 and 212 operate independently of each other. Accordingly, the first and second sets of data drivers 221, 222 operate independently of each other and the first and second sets of gate drivers 241, 242 operate independently of each other. The result is that the pixels 281 in the first panel 271 and the pixels 282 in the second panel 272 are displayed independently.

The reinforcement circuit 260 is disposed inside the GIP region 250 to interface to the gate driving lines $G_{11}, G_{12}, \ldots, G_{1N}$ at the first corresponding ends and to the gate driving lines $G_{21}, G_{22}, \ldots, G_{2N}$ at the second corresponding ends. The reinforcement circuit 260 reinforces signals of the gate driving lines $G_{11}, G_{12}, \ldots, G_{1N}$ at the first corresponding ends and to the gate driving lines $G_{21}, G_{22}, \ldots, G_{2N}$ at the second corresponding ends. Without the GIP region 250, the gate driving lines $G_{11}, G_{12}, \ldots, G_{1N}$ would be connected to the corresponding gate driving lines $G_{21}, G_{22}, \ldots, G_{2N}$ to become N gate driving lines arranged from the first set of gate drivers 241 to the second set of gate drivers 242. Various noise factors cause distortion of the signals on these lines, especially toward the middle of the gate driving circuit 240 because this area is located away from the gate drivers on the left and right edges. These noise factors may include forms of resistive capacitive (RC) delays, attenuations, crosstalk, and reflections. The reinforcement circuit 260 is placed in the middle of the gate driving circuit 240 where signal distortion is most severe. The reinforcement circuit 260 reinforces the signals and reducing the signal distortion by several methods. These methods may include reducing resistive and capacitive delays, strengthening driving capability, filtering the signals with high-pass filters, and sharpening the signals at the first and second ends on the gate driving lines $G_{11}, G_{12}, \ldots, G_{1N}$ and $G_{21}, G_{22}, \ldots, G_{2N}$.

Figure 4:
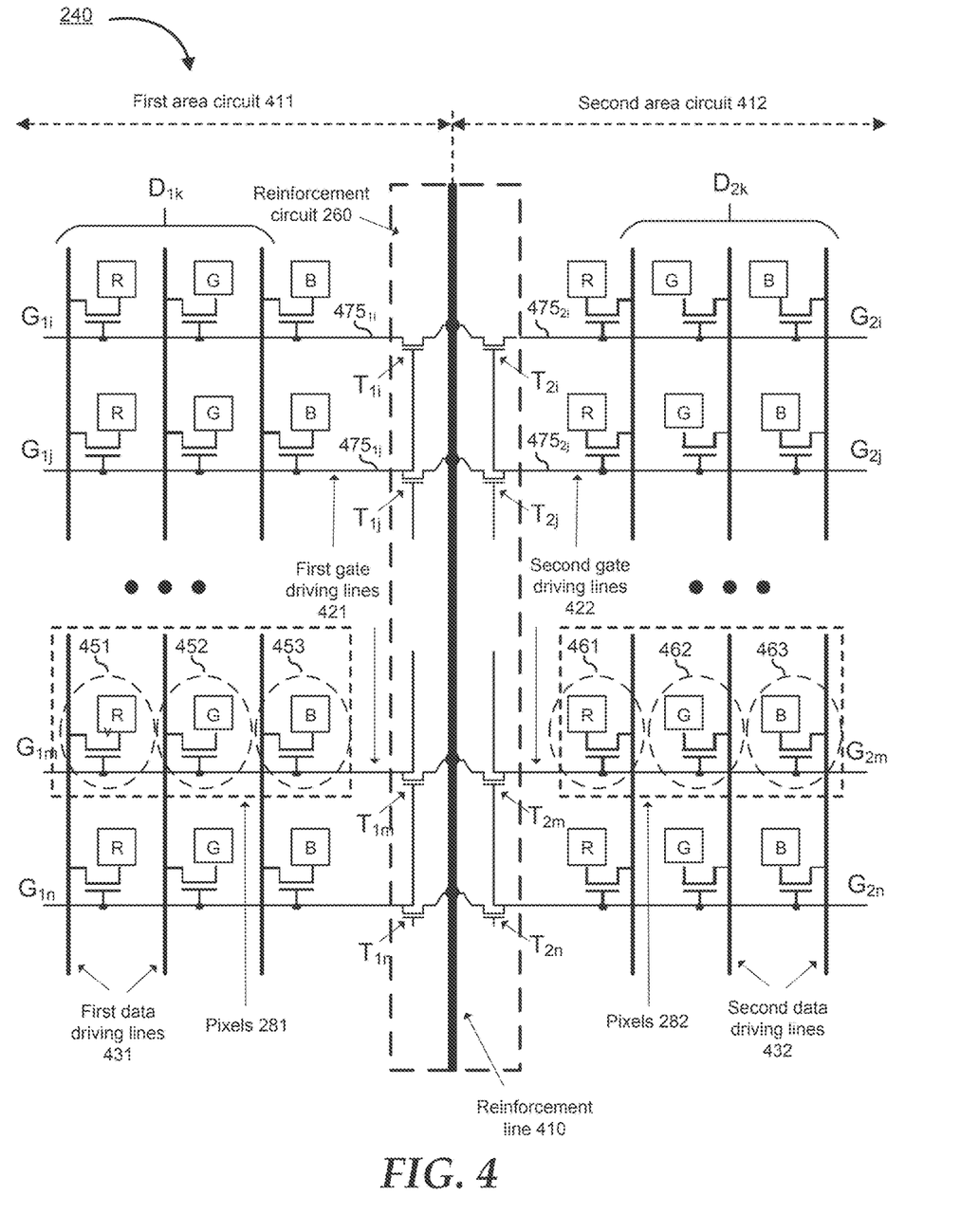
FIG. 4 is a diagram illustrating part of a gate driving circuit that shows a reinforcement circuit according to an embodiment of the present disclosure.

FIG. 4 is a circuit diagram illustrating part of the gate driving circuit 240 showing the reinforcement circuit 260 according to an embodiment of the present disclosure. The gate driving circuit 240 includes the reinforcement circuit 260, a first area circuit 411, a second area circuit 412, first gate driving lines 421, second gate driving lines 422, first data driving lines 431, second data driving lines 432, As discussed earlier, the reinforcement circuit 260 is located inside the GIP region 250 that partitions the gate driving circuit 240 into the first and second area circuits 411 and 412. The first area circuit 411 has the first gate driving lines 421 $G_{1k}$ (k=1, ..., N) that are arranged in the first direction (e.g., horizontal) and the first data driving lines 431 $D_{1k}$ (k=1, ..., M) that are arranged in the second direction (e.g., vertical). The first gate driving lines 421 are driven by the first set of gate drivers 241 (shown in FIG. 3). The first data driving lines 431 are driven by the first set of data drivers 221 (shown in FIG. 3). The second area circuits 412 has the second gate driving lines 422 $G_{2k}$ (k=1, ..., N) that are arranged in the first direction and the second data driving lines 432 $D_{2k}$ (k=1, ..., M) that are arranged in the second direction. The second gate driving lines 422 are driven by the second set of gate drivers 242 (shown in FIG. 3). The second data driving lines 432 are driven by the second set of data drivers 222 (shown in FIG. 3).

In the first area circuit 411, pixels 281 are formed at the intersections of the first gate driving lines 421 and the first data driving lines 431. A pixel 281 includes three sub-pixels 451, 452, and 453 that correspond to three colors Red (R), Green (G), and Blue (B), respectively. In the second area circuit 412, pixels 282 are formed at the intersections of the second gate driving lines 422 and the second data driving lines 432. A pixel 282 includes three sub-pixels 461, 462, and 463 that correspond to three colors R, G, and B, respectively.

The GIP region 250 intersects the first gate driving lines $G_{1k}$ (k=1, ..., N) at first corresponding ends $475_{1k}$ (k=1, ..., N). Shown illustratively in the figure are two ends $475_{1i}$ and $475_{1j}$. The GIP region 250 intersects the second gate driving lines $G_{2k}$ (k=1, ..., N) at second corresponding ends $475_{2k}$ (k=1, ..., N). Shown illustratively in the figure are two ends $475_{2i}$ and $475_{2j}$. The pairs of first and second corresponding ends $475_{1i}$, $475_{1j}$ and $475_{2i}$, $475_{2j}$ are the connecting points for part of the reinforcement circuit 260 at those two gate driving lines. Other parts of the circuit are similarly described.

The reinforcement circuit 260 reinforces the driving lines and reduces the signal distortion by at least one of the following methods: (1) reducing resistive and capacitive delays on the first and second pluralities of gate driving lines, (2) strengthening driving capability of the first and second pluralities of gate driving lines, (3) filtering the signals at the first and second ends with a plurality of high-pass filters, and (4) sharpening the signals at the first and second ends. In one embodiment, the reinforcement circuit 260 may include a reinforcement line 410 that may be disposed, positioned, or placed longitudinally in the GIP region 250. It may be connected to the first corresponding ends $475_{1k}$ (k=1, ..., N) and the second corresponding ends $475_{2k}$ (k=1, ..., N). The reinforcement line 410 may be a conductor of appropriate conducting material and may be connected to a predefined voltage source with appropriate pull-up or pull-down elements. By connecting all these corresponding ends, the reinforcement line 410 acts as a terminating device that helps reinforcing the signals arriving at these corresponding ends from the corresponding gate drivers. Additional elements may be attached between the first and second corresponding ends $475_{1k}$ and $475_{2k}$ (k=1, ..., N) to further enhance the reinforcement. These elements may include passive elements (e.g., resistors, capacitors) or active elements (e.g., transistors), or a combination of them. In one embodiment, these additional elements may include N pairs of circuit elements $T_{1k}$ and $T_{2k}$ (k=1, ..., N). The $T_{1k}$ elements are located in the first area circuit 411 and the $T_{2k}$ elements are located in the second area circuit 412. The reinforcement line 410 is connected to the N pairs of circuit elements $T_{1k}$ and $T_{2k}$ (k=1, ..., N) at the corresponding ends $475_{1k}$ (k=1, ..., N). in the first area circuit 411 and $475_{2k}$ (k=1, ..., N) in the second area circuit 412.

For illustrative purposes, only the pairs $T_{1i}$, $T_{1j}$ and $T_{2i}$, $T_{2j}$ are described. In one embodiment, these elements are thin-film transistors (TFTs). Other elements with a similar performance may be used. In addition, the term source/drain used in the description of a TFT may be exchanged as drain/source as appropriate. For ease of reference, the term first terminal and second terminal of the TFT are used to designate the source/drain terminals. The first terminal of $T_{1i}$ is connected to the corresponding end $475_{1i}$, The second terminal of $T_{1i}$ is connected to the second terminal of $T_{2i}$ at the reinforcement line 410. The first terminal of $T_{2i}$ is connected to the corresponding end $475_{2i}$. Similarly, the first terminal of $T_{1j}$ is connected to the corresponding end $475_{1j}$, The second terminal of $T_{1j}$ is connected to the second terminal of $T_{2j}$ at the reinforcement line 410. The first terminal of $T_{2j}$ is connected to the corresponding end $475_{2j}$. In addition, the gate of $T_{1i}$ is connected to the corresponding end $475_{1j}$ and the first terminal of $T_{1j}$. Similarly, the gate of $T_{2i}$ is connected to the corresponding end $475_{2j}$ and the first terminal of $T_{2j}$. Accordingly, the reinforcement line 410 is connected to the second terminals of the elements $T_{1k}$ and $T_{2k}$ (k=1, ..., N). In this configuration, the reinforcement circuit 260 operates to reinforce or strengthen the signals along the gate driving lines $G_{1k}$ and $G_{2k}$ (k=1, ..., N) from the start at the first set of gate drivers 231 to the corresponding ends $475_{1k}$ (k=1, ..., N) and from the start at the second set of gate drivers 232 to the corresponding ends $475_{2k}$ (k=1, ..., N). This reinforcement in effect reduces the signal distortion along the gate driving lines $G_{1k}$ and $G_{2k}$ (k=1, ..., N), especially at the corresponding ends $475_{1k}$ and $475_{2k}$ (k=1, ..., N)

FIG. 5 is a diagram illustrating the gate driving circuit 240 showing signal distortion when the reinforcement circuit is not used according to an embodiment of the present disclosure. For simplicity and clarity, only relevant elements are shown. Since the reinforcement circuit is not used, there is only one set of gate driving lines 605 $G_k$ (k=1, ..., N). There are still two sets of gate drivers 241 and 242 located on both sides of the gate driving circuit 240. Suppose one of the gate drivers 241 generates a signal 510 at the start of the gate driving line. Suppose the signal 510 has a shape as shown and is defined within time instants n and m. As the signal propagates through the gate driving line, it arrives as a signal 520 at the location in the middle of the gate driving circuit at a time T after the starting time. Due to various noise factors discussed earlier, the signal 520 does not retain the same shape as the starting signal 510. For an RC delay noise factor, the tail end of the signal 520 is stretched beyond the time instant m+T. In addition, the signal 520 has a slow roll-off curve at the end. Due to this signal distortion, the pixel quality is degraded. The same condition exists for the signals generated at the second gate drivers 242. Together, the signals in the middle of the gate driving circuit 240 become distorted or weak, resulting in poor pixel quality as displayed on the display panel.

Figure 6:
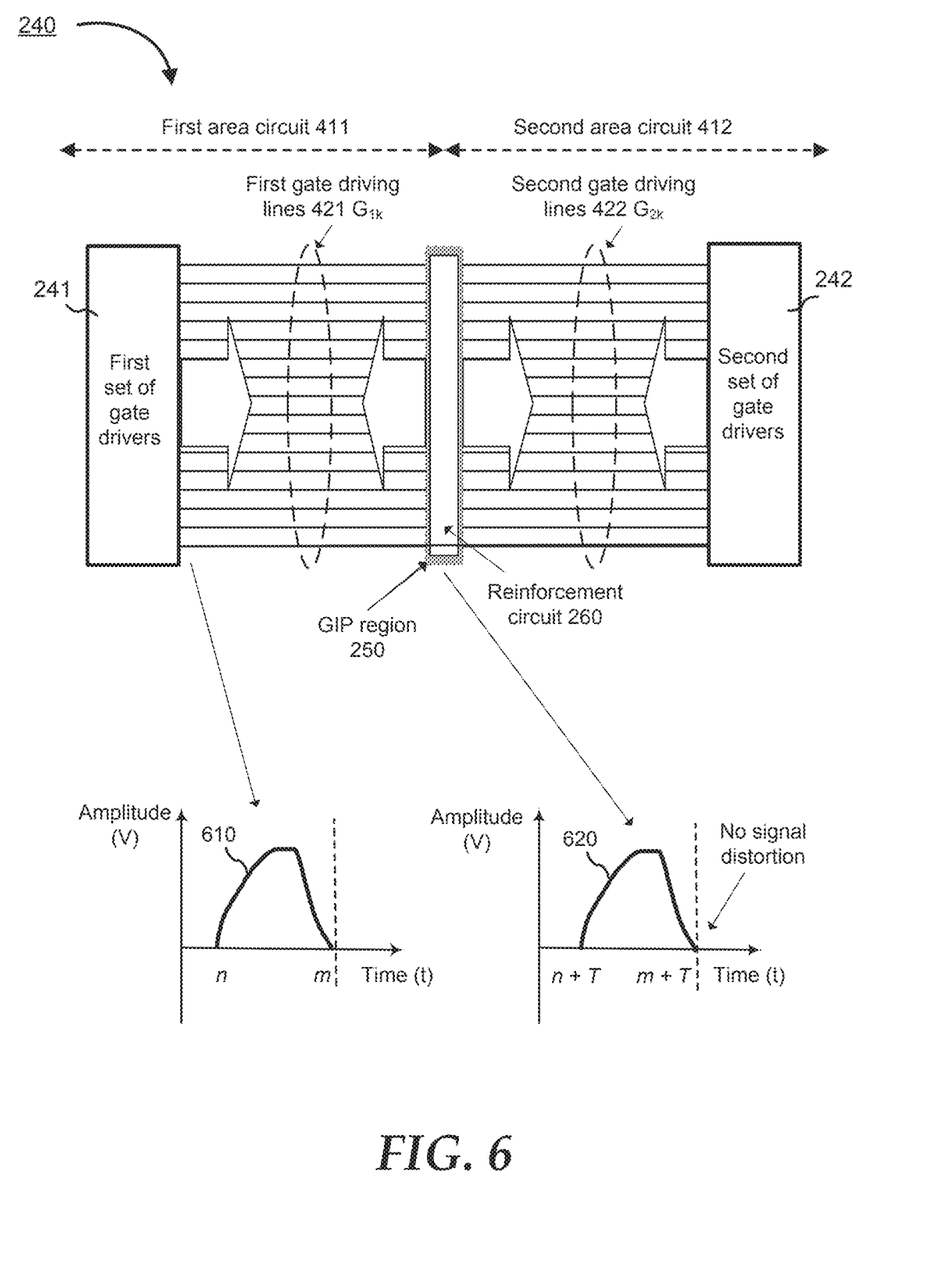
FIG. 6 is a diagram illustrating no signal distortion when the reinforcement circuit is used according to an embodiment of the present disclosure.

FIG. 6 is a diagram illustrating the gate driving circuit 240 showing no signal distortion when the reinforcement circuit is used according to an embodiment of the present disclosure. For simplicity and clarity, only relevant elements are shown. The reinforcement circuit 260 is disposed in the GIP region 250 which partitions the gate driving circuit 240 into the first area circuit 411 and the second area circuit 412. The reinforcement circuit 260 generates compensating or correcting signals in the opposite direction of the signals generated from the gate drivers 241 and 242.

Suppose one of the gate drivers 241 generates a signal 610 at the start of the gate driving line. Suppose the signal 610 has a shape similar to the signal 510 shown in FIG. 5 as shown and is defined within time instants n and m. As the signal propagates through the gate driving line, it arrives as a signal 620 at the corresponding end $275_{1k}$ at the GIP region 250 in the middle of the gate driving circuit at a time T after the starting time. Due to various noise factors discussed earlier, the signal 620 would not retain the same shape as the starting signal 610. For an RC delay noise factor, the tail end of the signal 620 would have been stretched beyond the time instant m+T and would have had a slow roll-off curve as shown in FIG. 5. However, thanks to the reinforcement circuit 250, this signal distortion is compensated, canceled, filtered, or nullified, resulting in a clean signal 620 the same as the signal 610. Due to this compensation, cancelation, filtering, or nullification of the signal distortion, the pixel quality is significantly improved. The same condition exists for the signals generated at the second gate drivers 242. Together, the signals in the middle of the gate driving circuit 240 become clean and strong, resulting in high pixel quality as displayed on the display panel.

Figure 7:
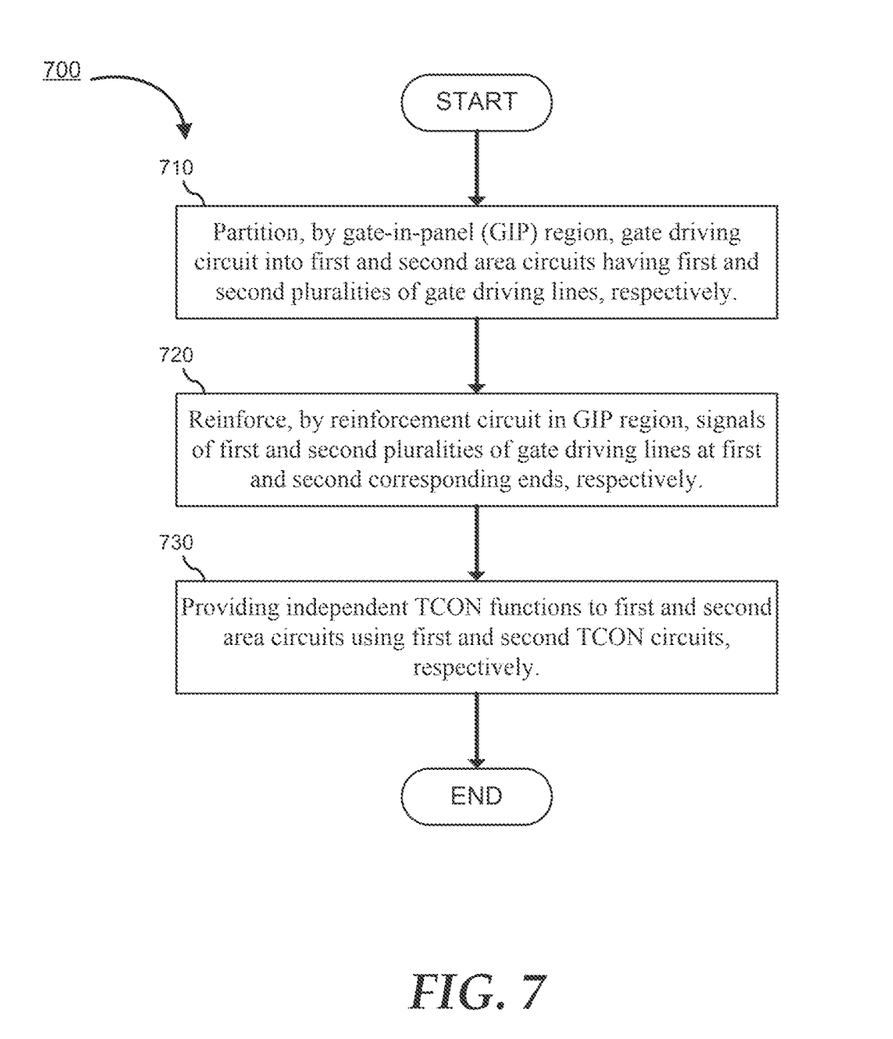
FIG. 7 is a flowchart illustrating a process to control the display gate circuit and to reduce signal distortion according to an embodiment of the present disclosure.

FIG. 7 is a flowchart illustrating a process 700 to control the display gate circuit and to reduce signal distortion according to an embodiment of the present disclosure.

Upon START, the process 700 partitions a gate driving circuit into first and second area circuits having first and second pluralities of gate driving lines, respectively (Block 710). This partitioning is performed by a gate-in-panel (GIP) region disposed in the middle of the gate driving circuit. The GIP region intersects the first and second sets of gate driving lines at first and second corresponding ends, respectively. The first and second sets of gate driving lines are configured to be arranged in a first direction, e.g., horizontal direction. The GIP region is configured to be arranged in a second direction, e.g., vertical direction, perpendicular to the first direction. Then, the process 700 reinforces signals of the first and second sets of gate driving lines at the first and second corresponding ends, respectively (Block 720). Next, the process 700 provides independent TCON functions to the first and second area circuits using first and second timing and control (TCON) circuits, respectively (Block 730). The process 700 is then terminated.

Figure 8:
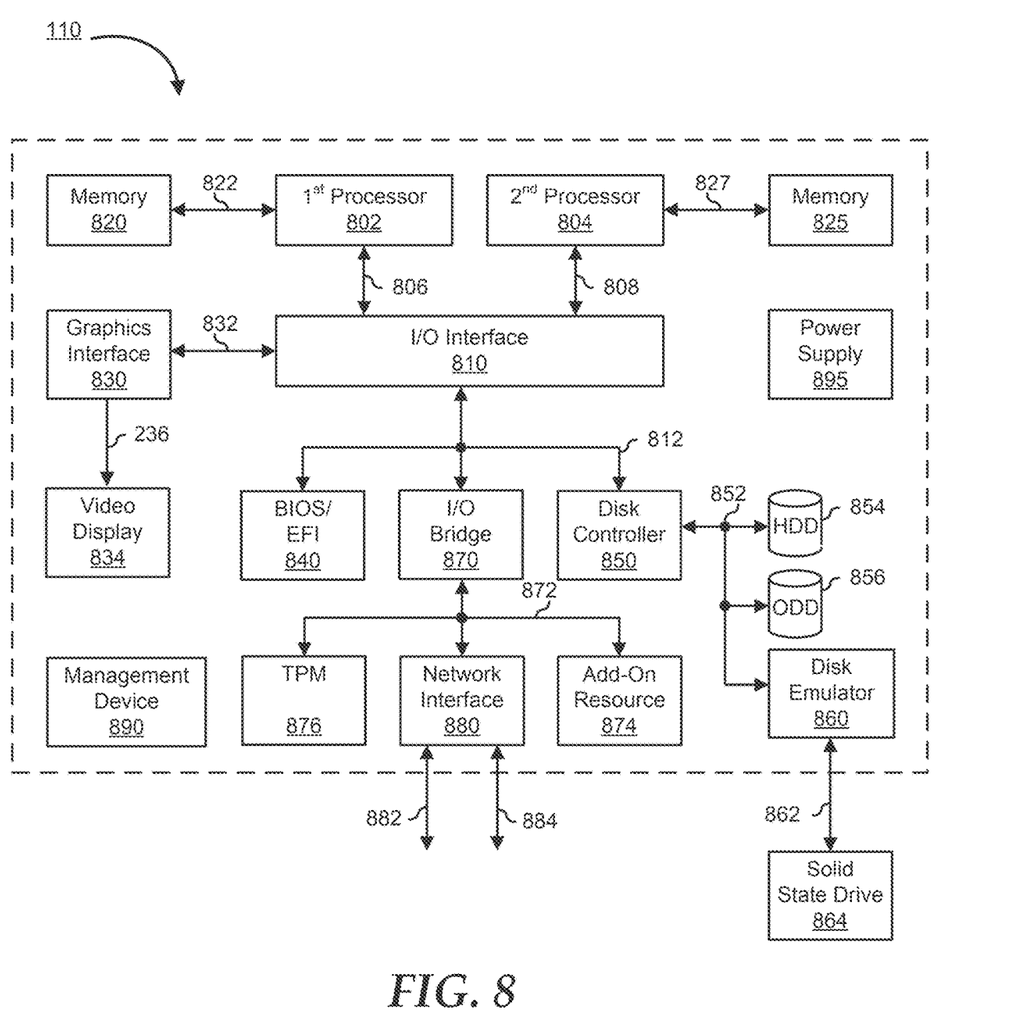
FIG. 8 is a block diagram illustrating an information handling system as a host system according to an embodiment of the present disclosure.

FIG. 8 illustrates a generalized embodiment of an information handling system similar to the host system 110 shown in FIG. 1. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 110 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware.

Information handling system 110 can also include one or more computer-readable medium for storing machine-executable code, such as software or data. Additional components of information handling system 110 can include one or more storage devices that can store machine-executable code, one or more communications ports for communicating with external devices, and various input and output (I/O) devices, such as a keyboard, a mouse, and a video display. Information handling system 110 can also include one or more buses operable to transmit information between the various hardware components.

Information handling system 110 can include devices or modules that embody one or more of the devices or modules described below, and operates to perform one or more of the methods described below. Information handling system 110 includes first and second processors 802 and 804, an input/output (I/O) interface 810, memories 820 and 825, a graphics interface 830, a basic input and output system/universal extensible firmware interface (BIOS/UEFI) module 840, a disk controller 850, a hard disk drive (HDD) 854, an optical disk drive (ODD) 856, a disk emulator 860 connected to an external solid state drive (SSD) 862, an I/O bridge 870, one or more add-on resources 874, a trusted platform module (TPM) 876, a network interface 880, a management device 890, and a power supply 895. Processors 802 and 804, I/O interface 810, memory 820, graphics interface 830, BIOS/UEFI module 840, disk controller 850, HDD 854, ODD 856, disk emulator 860, SSD 862, I/O bridge 870, add-on resources 874, TPM 876, and network interface 880 operate together to provide a host environment of information handling system 110 that operates to provide the data processing functionality of the information handling system. The host environment operates to execute machine-executable code, including platform BIOS/UEFI code, device firmware, operating system code, applications, programs, and the like, to perform the data processing tasks associated with information handling system 110.

In the host environment, processor 802 is connected to I/O interface 810 via processor interface 806, and processor 804 is connected to the I/O interface via processor interface 808. Memory 820 is connected to processor 802 via a memory interface 822. Memory 825 is connected to processor 804 via a memory interface 827. Graphics interface 830 is connected to I/O interface 810 via a graphics interface 832, and provides a video display output 836 to a video display 834. In a particular embodiment, information handling system 110 includes separate memories that are dedicated to each of processors 802 and 804 via separate memory interfaces. An example of memories 820 and 830 include random access memory (RAM) such as static RAM (SRAM), dynamic RAM (DRAM), non-volatile RAM (NV-RAM), or the like, read only memory (ROM), another type of memory, or a combination thereof. Processor 802 and/or processor 804 may process data or information to be displayed on display panel 150 (shown in FIG. 1) in two separate screens 151 and 152. The data to be displayed may include pixel data 231 and pixel data 232 shown in FIG. 3.

BIOS/UEFI module 840, disk controller 850, and I/O bridge 870 are connected to I/O interface 810 via an I/O channel 812. An example of I/O channel 812 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 810 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 840 includes BIOS/UEFI code operable to detect resources within information handling system 110, to provide drivers for the resources, initialize the resources, and access the resources. BIOS/UEFI module 840 includes code that operates to detect resources within information handling system 110, to provide drivers for the resources, to initialize the resources, and to access the resources.

Disk controller 850 includes a disk interface 852 that connects the disk controller to HDD 854, to ODD 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits SSD 864 to be connected to information handling system 110 via an external interface 862. An example of external interface 862 includes a USB interface, an IEEE 1394 (Firewire) interface, a proprietary interface, or a combination thereof. Alternatively, solid-state drive 864 can be disposed within information handling system 110.

I/O bridge 870 includes a peripheral interface 872 that connects the I/O bridge to add-on resource 874, to TPM 876, and to network interface 880. Peripheral interface 872 can be the same type of interface as I/O channel 812, or can be a different type of interface. As such, I/O bridge 870 extends the capacity of I/O channel 812 where peripheral interface 872 and the I/O channel are of the same type, and the I/O bridge translates information from a format suitable to the I/O channel to a format suitable to the peripheral channel 872 where they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 110, a device that is external to the information handling system, or a combination thereof.

Network interface 880 represents a NIC disposed within information handling system 110, on a main circuit board of the information handling system, integrated onto another component such as I/O interface 810, in another suitable location, or a combination thereof. Network interface device 880 includes network channels 882 and 884 that provide interfaces to devices that are external to information handling system 110. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management device 890 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 110. In particular, management device 890 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 110, such as system cooling fans and power supplies. Management device 890 can include a network connection to an external management system, and the management device can communicate with the management system to report status information for information handling system 200, to receive BIOS/UEFI or system firmware updates, or to perform other task for managing and controlling the operation of information handling system 110. Management device 890 can operate off of a separate power plane from the components of the host environment so that the management device receives power to manage information handling system 110 where the information handling system is otherwise shut down. An example of management device 890 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like.

Management device 890 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A Liquid Crystal Display (LCD) circuit, comprising:
   a gate-in-panel (GIP) region that partitions a gate driving circuit into first and second area circuits having first and second pluralities of gate driving lines, respectively, the GIP region intersecting the first and second pluralities of gate driving lines at first and second corresponding ends, respectively;
   first and second timing and control (TCON) circuits configured to provide independent TCON functions to the first and second area circuits, respectively,
   wherein the first and second pluralities of gate driving lines are configured to be arranged in a first direction, and
   wherein the GIP region is configured to be arranged in a second direction perpendicular to the first direction; and
   a reinforcement circuit including:
      a reinforcement line longitudinally positioned in the GIP region; and
      a transistor circuit connected to the reinforcement line and the first and second corresponding ends and configured to reduce signal distortion at the signals at the first and second corresponding ends.

2. The LCD circuit of claim 1 further comprising:
   a reinforcement circuit in the GIP region configured to reinforce signals of the first and second pluralities of gate driving lines at the first and second corresponding ends, respectively.

3. The LCD circuit of claim 2 wherein the reinforcement circuit reduces signal distortion at the signals at the first and second corresponding ends by at least one of (1) reducing resistive and capacitive delays on the first and second pluralities of gate driving lines, (2) strengthening driving capability of the first and second pluralities of gate driving lines, (3) filtering the signals at the first and second ends with a plurality of high-pass filters, and (4) sharpening the signals at the first and second ends.

4. The LCD circuit of claim 1 wherein the GIP region is disposed in middle of the gate driving circuit.

5. The LCD circuit of claim 1 wherein the gate driving circuit includes a first set of gate drivers that drive the first plurality of gate driving lines and a second set of gate drivers that drive the second plurality of gate driving lines.

6. The LCD circuit of claim 1 wherein the independent TCON functions include independent controls of display resolution, frequency refresh rate, on/off, image display, and color mode.

7. The LCD circuit of claim 1 wherein the first and second area circuits correspond to first and second display screens of a wide display panel.

8. The LCD circuit of claim 7 wherein the wide display panel has a resolution of one of a High Definition (HD) (1280×720), a Full HD (1920×1080), a Quad HD (2560×1440), an Ultra HD or 4K (3840×2160), and an 8K (7680×4320).

9. A method, comprising:
   partitioning, by a gate-in-panel (GIP) region, a gate driving circuit into first and second area circuits having first and second pluralities of gate driving lines, respectively, the GIP region intersecting the first and second pluralities of gate driving lines at first and second corresponding ends, respectively;
   providing independent TCON functions to the first and second area circuits using first and second timing and control (TCON) circuits, respectively,
   wherein the first and second pluralities of gate driving lines are configured to be arranged in a first direction, and
   wherein the GIP region is configured to be arranged in a second direction perpendicular to the first direction;
   reinforcing signals of the first and second pluralities of gate driving lines at the first and second corresponding ends, respectively;
   positioning a reinforcement line longitudinally in the GIP region; and
   reducing signal distortion at the signals at the first and second corresponding ends using a transistor circuit.

10. The method of claim 9 wherein the GIP region is disposed in middle of the gate driving circuit.

11. The method of claim 9 wherein reinforcing comprises reducing signal distortion it the signals at the first and second corresponding ends by at least one of (1) reducing resistive and capacitive delays on the first and second pluralities of gate driving lines, (2) strengthening driving capability of the first and second pluralities of gate driving lines, (3) filtering the signals at the first and second ends with a plurality of high-pass filters, and (4) sharpening the signals at the first and second ends.

12. The method of claim 9 further comprises driving the first and second pluralities of gate driving lines using first and second sets of gate drivers, respectively.

13. The method of claim 9 wherein providing the independent TCON functions comprises providing independent controls of display resolution, frequency refresh rate, on/off, image display, and color mode.

14. The method of claim 9 wherein the first and second area circuits correspond to first and second display screens of a wide display panel.

15. An information handling system, comprising:
  a scaler configured to receive and upscale first and second video signals;
  a wide display panel having first and second display screens; and
  a Liquid Crystal Display (LCD) circuit, comprising:
    a gate-in-panel (GIP) region that partitions a gate driving circuit into first and second area circuits having first and second pluralities of gate driving lines, respectively, the GIP region intersecting the first and second pluralities of gate driving lines at first and second corresponding ends, respectively;
    first and second timing and control (TCON) circuits configured to provide independent TCON functions to the first and second area circuits, respectively,
    wherein the first and second pluralities of gate driving lines are configured to be arranged in a first direction,
    wherein the GIP region is configured to be arranged in a second direction perpendicular to the first direction, and
    wherein the first and second area circuits correspond to the first and second display screens, respectively; and
  a reinforcement circuit including:
    a reinforcement line longitudinally positioned in the GIP region; and
    a transistor circuit connected to the reinforcement line and the first and second corresponding ends and configured to reduce signal distortion at the signals at the first and second corresponding ends
  wherein the upscaled first and second video signals are delivered to the first and second TCON circuits to be independently displayed on the first and second display screens, respectively.

\* \* \* \* \*